United States Patent [19]

Dewan et al.

[11] Patent Number: 5,695,886

[45] Date of Patent: Dec. 9, 1997

[54] OVERVOLTAGE DISCONNECT CIRCUIT AND BATTERY USING SAME

[75] Inventors: Sudeep S. Dewan, Duluth; Jose M. Fernandez, Lawrenceville; Vernon Meadows, Lilburn, all of Ga.

[73] Assignee: Motorola, Inc., Schaumburg, Ill.

[21] Appl. No.: 612,470

[22] Filed: Mar. 7, 1996

[51] Int. Cl.$^6$ ............................................. H01M 10/46
[52] U.S. Cl. ........................ 429/7; 429/61; 429/90; 320/39
[58] Field of Search ........................... 429/7, 61, 90–92; 320/30, 39, 40

[56] References Cited

U.S. PATENT DOCUMENTS

| | | | |
|---|---|---|---|
| 4,467,266 | 8/1984 | Ritchie | 320/40 |
| 5,192,905 | 3/1993 | Karlin et al. | 320/23 |
| 5,304,915 | 4/1994 | Sanpei et al. | 320/14 |
| 5,477,130 | 12/1995 | Hashimoto et al. | 320/49 |
| 5,530,336 | 6/1996 | Eguchi et al. | 320/5 |
| 5,539,299 | 7/1996 | Fernandez et al. | 320/39 |
| 5,547,775 | 8/1996 | Eguchi et al. | 429/7 |
| 5,554,919 | 9/1996 | Uchida et al. | 320/14 |
| 5,569,550 | 10/1996 | Garrett et al. | 429/7 |
| 5,604,415 | 2/1997 | Vashi et al. | 320/12 |

*Primary Examiner*—Anthony Skapars
*Attorney, Agent, or Firm*—Scott M. Garrett; Kenneth M. Massaroni; Kelly A. Gardner

[57] ABSTRACT

A lithium ion battery is provided with an overvoltage switch (12) and an overvoltage control circuit (14). The overvoltage control circuit causes the overvoltage switch to open, thus disconnecting the battery from a charger, upon the battery voltage reaching a first predetermined level when charged by a charger not designed to charge a lithium ion battery. However, when the battery is connected to an appropriately designed charger, the battery receives an input signal through an input terminal (24) which causes the overvoltage control circuit to open the overvoltage switch at a higher second predetermined level, should the appropriately designed charger fail to enter voltage regulation when the battery voltage reaches the first predetermined level.

14 Claims, 1 Drawing Sheet

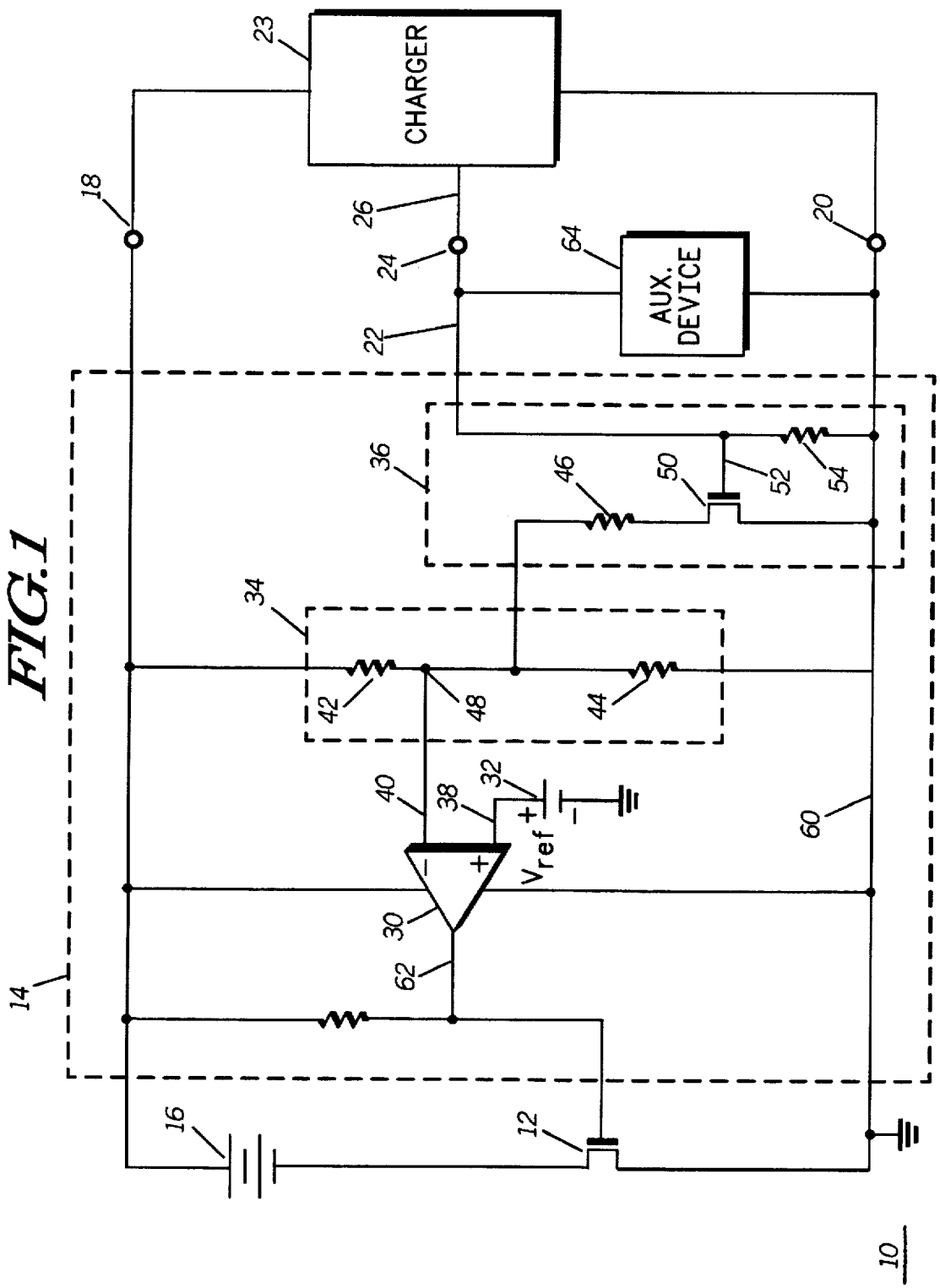

OVERVOLTAGE DISCONNECT CIRCUIT AND BATTERY USING SAME

TECHNICAL FIELD

This invention relates in general to batteries, and in particular to lithium ion batteries having overvoltage disconnect circuits.

BACKGROUND

Lithium ion batteries are quickly gaining widespread popularity for powering portable electronic devices because of their superior energy density compared with more conventional battery systems such as nickel-cadmium and sealed lead-acid batteries. However, unlike the recent arrival of nickel-metal hydride batteries, lithium ion batteries require new charging regimes not used by any of the previous systems. Specifically, the lithium ion charge regime is a constant current to constant voltage regime. First, the lithium ion cells are charged with a constant current until a threshold voltage is reached, then the voltage is held constant by voltage regulation. The voltage regulation portion is critical. For optimum performance the voltage must be maintained within a very small tolerance, any less and the cells do not get fully charged, any more and the cells suffer significant overcharge.

Such a significantly different charging regime would ordinarily indicate that new chargers would need to be designed to accommodate lithium ion batteries. And indeed many manufacturers have begun marketing chargers designed to provide the preferred lithium ion charge regime. However, it is often the case that a user may not desire to purchase both a new battery and a new charger as this can be an expensive proposition. Accordingly, efforts have been undertaken to retrofit lithium ion batteries into existing nickel system chargers. That is, a lithium ion battery contains circuitry so that a significant portion of the lithium ion charge regime may be realized from these older chargers, without a negative effect on the lithium ion cells.

In order to achieve retrofit, one circuit that is typically used is an overvoltage disconnect circuit. The circuit has two components, an overvoltage switch and an overvoltage control circuit. The overvoltage switch is connected in series with the lithium ion cells, and the overvoltage control circuit operates the overvoltage switch in response to battery voltage. When the battery is inserted into a nickel system charger, the charger applies a constant current. When the battery voltage reaches an overvoltage threshold, the overvoltage circuit causes the overvoltage switch to disconnect the lithium ion cells from the charger. This protects the lithium ion cells from overcharge. This is not the most preferred method of charging lithium ion batteries, but the resulting capacity obtained is significantly above that of comparably sized nickel system batteries. To make sure that the most possible charge is realized, the overvoltage control circuit must not act too early, i.e., while the battery voltage is too low. This requires the circuit to be very precise.

One problem that has recently been recognized is that due to slight tolerance variations, the point at which the overvoltage disconnect circuit disconnects the battery may interfere with the operation of a charger designed to provide an optimum lithium ion charge regime. For example, if the overvoltage threshold is selected as 4.2 volts, and because of circuit tolerances, a particular battery might disconnect itself when the battery voltage reaches 4.15 volts, when the battery is placed in a proper lithium ion charger, the charger will not be able to recharge the battery at 4.2 volts voltage regulation. This is being referred to as "collision" between the battery circuit and the charger circuit. While 4.15 volts is an acceptable point to disconnect from a nickel system charger, if the circuit would allow the lithium ion charger to perform voltage regulated charging at 4.2 volts, a significant capacity increase will result. Therefore, there is a need for an overvoltage disconnect circuit which disconnects the battery at an acceptable battery voltage when used in a retrofit application, but which avoids the problem of collision when charged in a proper charger.

BRIEF DESCRIPTION OF THE DRAWING

The Drawing is a schematic circuit diagram of an overvoltage disconnect circuit used in a battery in accordance with the invention.

DETAILED DESCRIPTION OF THE PREFERRED EMBODIMENT

While the specification concludes with claims defining the features of the invention that are regarded as novel, it is believed that the invention will be better understood from a consideration of the following description in conjunction with the drawing Drawings, in which like reference numerals are carried forward.

Referring now to the Drawing, there is illustrated therein a schematic circuit diagram of an overvoltage disconnect circuit 10 in accordance with the invention. The circuit resides in a lithium ion battery pack, and comprises an overvoltage switch 12 and an overvoltage control circuit 14. The overvoltage switch is coupled in series with a lithium ion battery cell 16, which, more precisely, is at least one lithium ion battery cell, and may be several cells connected in series, parallel, or some combination thereof. The overvoltage control circuit is responsive to the battery voltage evident between the positive terminal 18 and the negative terminal 20. The overvoltage control circuit is also responsive to an input signal which, when present, is received on an input line 22. The battery is shown connected to a charger 23, which may be either a first type of charger or a second type of charger, as is explained herein.

The battery is constructed so that its package has the same form factor as non-lithium ion batteries for a particular product, but is additionally provided with an input terminal 24. The non-lithium ion batteries will not have the input terminal, and therefore neither will non-lithium ion chargers made to charge such batteries. When a lithium ion battery containing the circuit is inserted into, or otherwise electrically connected with one of these first type of chargers, no signal is then applied to the input terminal since the first type of charger was not designed to provide such a signal. The first type of charger then commences charging according to its design. Specifically, it provides a regulated constant current to the battery. The overvoltage switch 12 is initially closed to allow conduction of the charging current through the cell 16. During charging the overvoltage control circuit monitors the battery voltage. When the battery voltage reaches a first predetermined level, such as, for example, 4.1 volts per cell, and in the absence of an input signal, the overvoltage control circuit causes the overvoltage switch to open, thus disconnecting the battery from the charger.

A second type of charger, one which is specifically configured to provide a lithium ion compatible charge regime, is provided with an auxiliary line 26, which physically corresponds to the input terminal 24 of the lithium ion battery. This second type of charger provides the input signal to the lithium ion battery, where it is received on the input line 22. When the input signal is present, the overvoltage control circuit functions as before, but actuates the overvoltage switch when the battery voltage reaches a second predetermined level, which is higher than the first predetermined level. Since this second type of charger is configured to provide a lithium ion charge regime, the possibility of collision is avoided by causing the overvoltage control circuit to act at a higher battery voltage level. In effect, the overvoltage control circuit now acts as a back-up mechanism in case the second type of charger is defective for some reason. Whereas in a first type of charger, as described above, the first predetermined level of battery voltage may be 4.1 volts per cell, when connected with a charger of the second type, the control circuit acts at a slightly higher second predetermined level of battery voltage, such as, for example, 4.25 volts per cell.

Thus, when the lithium ion battery is used with a charger of the first type, the overvoltage control circuit acts as the primary means of terminating charging. When connected with a charger of the second type, the overvoltage control circuit acts as a back-up mechanism should the charger be defective. The second type of charger would enter voltage regulation upon the battery voltage reaching the first predetermined level, and continue to charge the battery according to the preferred regime. The overvoltage control circuit would never actuate the overvoltage switch unless the charger fails to enter voltage regulation at the appropriate level.

The preferred overvoltage control circuit comprises a comparator circuit 30, a voltage reference 32, a voltage divider 34, and a modifying switch 36 which modifies the voltage divider when the input signal is received. The comparator circuit 30 has a first input 38, such as a non-inverting input, and a second input 40, such as the inverting input. The voltage reference is connected to the first input, and provides a reference voltage $V_{ref}$. The voltage divider is connected between the positive terminal 18 and the negative terminal 20, and comprises an upper resistance 42 and a lower resistance 44 which form a midpoint node 48 connected to the second input 40 of the comparator circuit 30. The modifying switch 36 comprises a modifying resistance 46, switch transistor 50, and pull down resistance 54. The switch transistor is connected in series with the modifying resistance 46, which is coupled between the switch transistor and the midpoint node 48. The switch transistor input 52 is connected to the input line 22, and while no signal is applied to the input terminal 24, the voltage at the switch transistor input is pulled low by the pull down resistance 54.

To illustrate the operation of the overvoltage disconnect circuit, assume that the battery is first connected to a charger of the first type. That is, a charger not designed to recharge a lithium ion battery, and thus no signal is applied to the input terminal 24. As no input signal is received, the switch transistor 50, which is preferably an N-channel Metallic Oxide Semiconductor Field Effect Transistor (MOSFET), is open since it's input 52 is pulled low. That is, it acts as a high impedance. Thus, modifying resistance 46 is essentially floating and has no effect on the voltage divider 34.

The divided voltage produced at the midpoint node 48 is fed to the second input 40 of the comparator and compared to the reference voltage fed to the first input 38. For a given battery voltage $V_{batt}$, the difference between the comparator inputs is a $\Delta V_1$. When the voltage fed to the second input is lower than the voltage fed to the first input, the voltage at the output 62, which is fed to the overvoltage switch, also preferably an N-channel MOSFET, is at a high level such that the overvoltage switch is closed, or low impedance, thus allowing conduction. When the battery voltage reaches the first predetermined level, the resistances of the voltage divider are chosen such that the voltage fed to the second input will exceed the voltage fed to the first input. As a result, the voltage at the output 62 drops to a low level, thus switching off the overvoltage switch and disconnecting the battery.

When the battery is connected to a charger of the second type, one which is designed to charge lithium ion batteries and has been provided with an auxiliary line 26 corresponding with input terminal 24, an input signal is provided by the charger at this connection. The input signal is preferably a DC voltage of sufficient value, such as, for example, 5 volts, to cause switch transistor 50 to switch to a low impedance state. When this occurs, modifying resistance 46 will be virtually connected to the reference line 60, and in parallel with the lower resistance 44 of the voltage divider, thereby modifying the voltage divider by effectively decreasing the resistance from the midpoint node to the reference line. This has the effect of lowering the voltage at midpoint node 48 for the same given battery voltage $V_{batt}$ discussed previously. As a result, a $\Delta V_2$ is produced between the first and second inputs of the comparator, which is greater than $\Delta V_1$. Since the voltage is now lower at the midpoint node for the same battery voltage while connected to a charger of the second type, the battery voltage must reach a higher level for the voltage at the midpoint node to exceed the reference voltage. In practice the modifying resistance will be much larger than the lower resistance 44 since only a slight decrease in voltage is necessary.

An appreciation of the values of the resistances should be gained from the following example. Assume that there are 2 lithium ion battery cells in the battery, and that the cells must not exceed 4.1 volts, or a total of 8.2 volts for the battery. There are commercially available devices which will ensure that the cell voltages are balanced, and for the sake of clarity, assume that the cell voltages remain equivalent. A common value of commercially available voltage references is 2.5 volts, so assume this is the value of the reference voltage. Therefore, when the battery voltage reaches 8.2 volts, the voltage at the midpoint node must be 2.5 volts when the battery is recharged by the first type of charger. A typical value of the upper resistance might be, for example, 100 KOhms. Now a calculation is required to determine the value of the lower resistance. According to well known equations, the lower resistance is calculated as [(2.5)(100K)]/(8.2−2.5)=43.86 KOhms. Therefore, if the battery is to be disconnected when the battery voltage reaches 4.1 volts per cell, the reference voltage is 2.5 volts, and the upper resistance is 100 KOhms, the lower resistance must be 43.86 KOhms.

Now, when the battery is connected to a charger of the second type, the overvoltage control circuit will disconnect at a slightly higher voltage, say 4.25 volts per cell, or 8.5 volts total battery voltage. First, the effective lower resistance must be calculated, then the value of the modifying resistance can be determined given that the lower resistance has been selected as 43.86 Kohms. Applying the same equation as above, the new effective lower resistance is found as [(2.5)(100K)]/(8.5−2.5)=41.67 Kohms. The value of the modifying resistance necessary to affect this change is found from another well known equation as [(41.67)(43.86)]/[43.86−41.67]=834.5 KOhms. Therefore, in this example, in order for the overvoltage circuit to avoid collision with the voltage regulation of a second type charger, the modifying resistance should be 834.5 KOhms.

In practice it is typical that a lithium ion battery will have some auxiliary device 64, which will not be present in a conventional battery of the same form factor. As an example, it is common for a memory device to be included that contains information about the lithium ion battery, such as, for example, voltage regulation point, current level, charge capacity, etc. Since lithium ion is a relatively young battery cell chemistry, manufacturers of lithium ion cells use somewhat different chemical recipes, and often it is the case that cells manufactured by one maker require a first voltage regulation level, while those cells made by another maker require a second voltage regulation level. Since batteries may be constructed with either makers cells, it is imperative that the charger have correct charging parameters. As illustrated in the Drawing, it is possible to use the input terminal 24 for multiple uses. Here, the auxiliary device is a memory which is accessed by a charger of the second type when the battery is connected. The data is transferred relatively fast, and upon transference of data, the auxiliary line 26 of the charger is set to 5 volts, which will be sufficient to cause the switch transistor to close.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims. For example, although the present invention has been cast as having utility for use with lithium ion battery cells, it is contemplated that other similar chemistry cells may be used, such as lithium polymer cells, for example.

What is claimed is:

1. An overvoltage disconnect circuit for a lithium ion battery, said lithium ion battery having at least one lithium ion battery cell, a battery voltage, an input terminal, and being rechargeable in either a first type of charger or a second type of charger, said second type of charger providing an input signal, said overvoltage disconnect circuit comprising:

an overvoltage switch in series with said at least one lithium ion cell; and an overvoltage control circuit responsive to said battery voltage and said input signal for disconnecting said at least one lithium ion cell from the first type of charger or the second type of charger upon said battery voltage reaching a first predetermined level in the absence of said input signal, and disconnecting said lithium ion cell from said second type of charger upon said battery voltage reaching a second predetermined level when said input signal is applied to said input terminal.

2. An overvoltage disconnect circuit as defined in claim 1, further comprising a memory device.

3. An overvoltage disconnect circuit as defined by claim 2, wherein said memory device contains information for charging said lithium ion battery.

4. An overvoltage disconnect circuit as defined by claim 1, wherein said overvoltage control circuit comprises:

a comparator circuit having an output, a first input, and a second input, said output being connected to said overvoltage switch;

a voltage reference for providing a reference voltage to said first input;

a voltage divider having a midpoint node connected to said second input;

a switch transistor having an input connected to said input terminal for modifying said voltage divider upon receiving said input signal; and a modifying resistance coupled between said switch transistor and said midpoint node.

5. An overvoltage disconnect circuit for use in a battery having at least one lithium ion battery cell, a battery voltage, and an input terminal, said overvoltage disconnect circuit comprising:

an overvoltage switch connected in series with said at least one lithium ion battery cell; and an overvoltage control circuit for opening said overvoltage switch upon said battery voltage reaching either a first predetermined level, or a higher second predetermined level when an input signal is applied to said input terminal.

6. An overvoltage disconnect circuit as defined by claim 5, wherein said overvoltage switch is an N-channel MOSFET.

7. An overvoltage disconnect circuit as defined by claim 5, wherein said overvoltage control circuit comprises:

a comparator circuit having an output, a first input, and a second input, said output being connected to said overvoltage switch;

a voltage reference for providing a reference voltage to said first input;

a voltage divider for dividing said battery voltage and having a midpoint node connected to said second input;

a switch transistor having an input connected to said input terminal for modifying said voltage divider upon receiving said input signal; and a modifying resistance coupled between said switch transistor and said midpoint node.

8. An overvoltage disconnect circuit as defined by claim 7, wherein said switch transistor is an N-channel MOSFET.

9. An overvoltage disconnect circuit as defined by claim 7, wherein said switch transistor closes upon receiving said input signal.

10. A lithium ion battery having a battery voltage, a positive terminal, a negative terminal, and an input terminal, said lithium ion battery comprising:

at least one lithium ion battery cell;

an overvoltage switch connected in series with said at least one lithium ion battery cell; and an overvoltage control circuit for opening said overvoltage switch upon said battery voltage reaching either a first predetermined level, or a higher second predetermined level when an input signal is applied to said input terminal.

11. A lithium ion battery as defined by claim 10, wherein said overvoltage switch is an N-channel MOSFET.

12. A lithium ion battery as defined by claim 10 wherein said overvoltage control circuit comprises:

a comparator circuit having an output, a first input, and a second input, said output being connected to said overvoltage switch;

a voltage reference for providing a reference voltage to said first input;

a voltage divider connected between said positive terminal and said negative terminal for dividing said battery voltage and having a midpoint node connected to said second input;

a switch transistor having an input connected to said input terminal for modifying said voltage divider upon receiving said input signal; and a modifying resistance coupled between said switch transistor and said midpoint node.

13. A lithium ion battery as defined by claim 12, wherein said switch transistor is an N-channel MOSFET.

14. A lithium ion battery as defined by claim 12, wherein said switch transistor closes upon receiving said input signal, thereby connecting said modifying resistance in parallel with a lower resistance of said voltage divider.

* * * * *